Patented Aug. 18, 1936

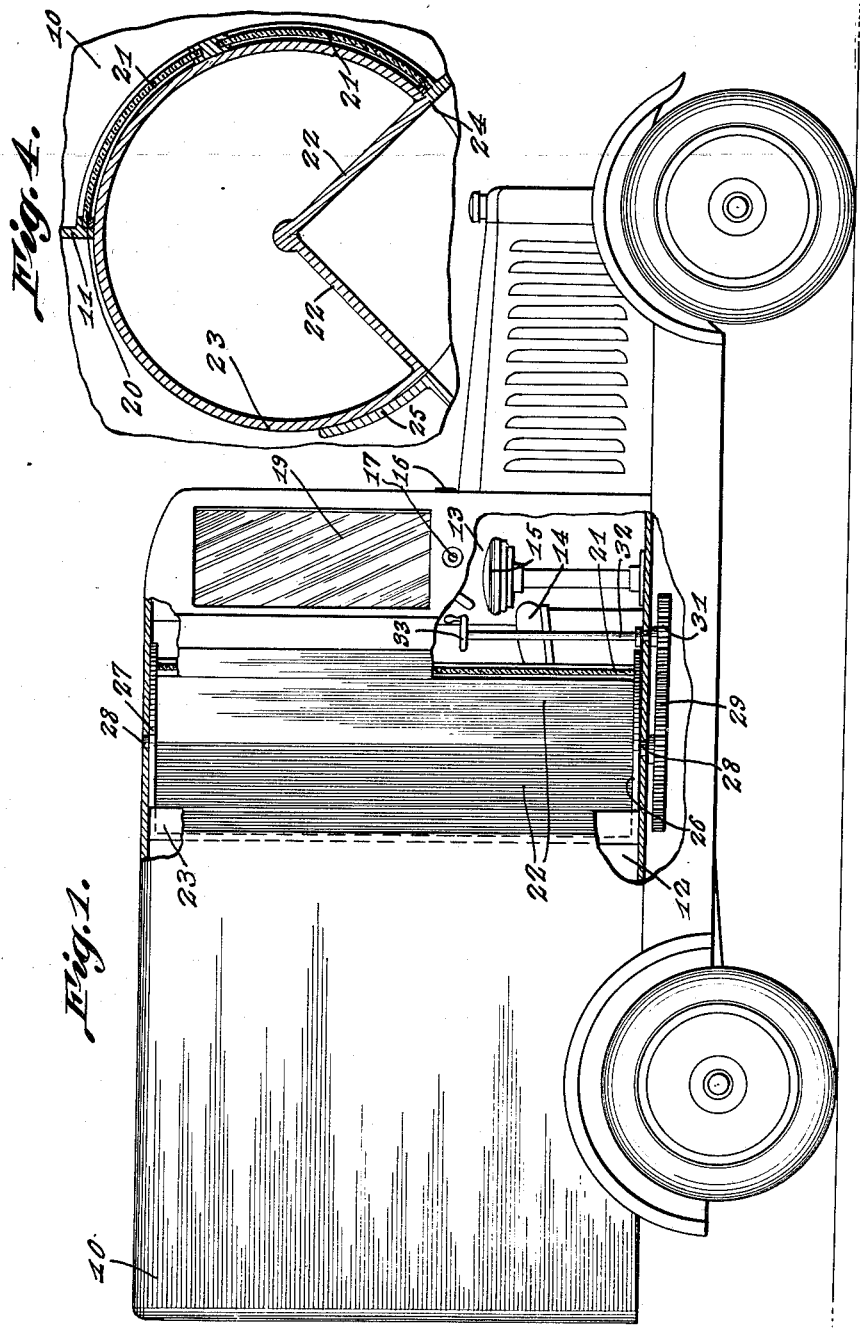

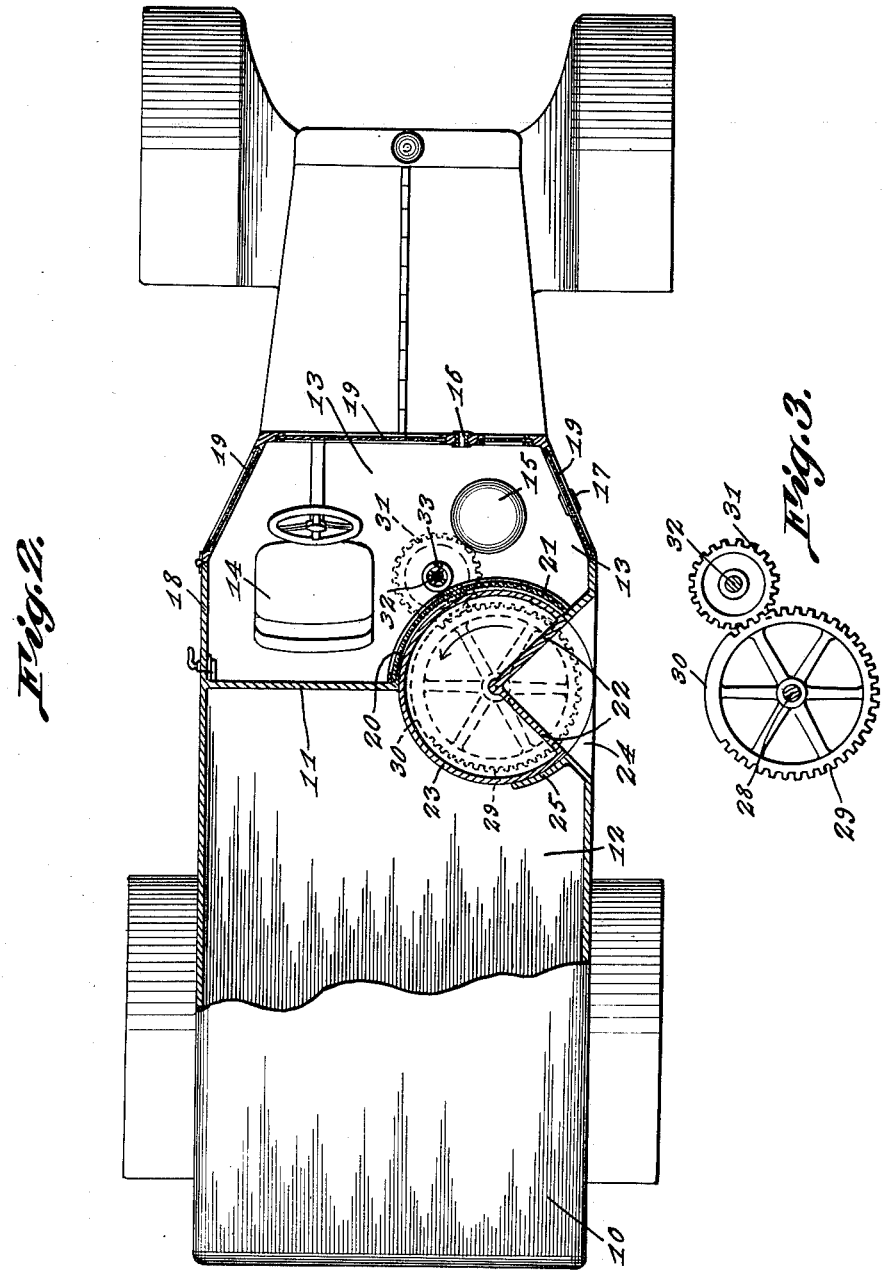

2,051,753

UNITED STATES PATENT OFFICE 2,051,753

ARMORED MOTOR TRUCK BODY

Robert A. Steckly, New York, N. Y.

Application November 12, 1935, Serial No. 49,403

1 Claim. (Cl. 296—24)

This invention relates to armored trucks for transporting money and other valuables and has for an object to provide a novel revolving door which will permit the messenger or other attendant being identified by the driver when entering the storage compartment for valuables.

A further object is to provide an armored truck body having a single revolving entrance and exit door, which may be locked by the guard or the driver in position to hold prisoner any unauthorized person attempting to surreptitiously enter the compartment for the valuables.

A further object is to provide a device of this character which will be strong, durable and bullet proof, which may be constructed at minimum cost, and which will withstand rough conditions of service.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawings forming part of this specification,

Figure 1 is a side elevation of an armored truck constructed in accordance with the invention with parts broken away to expose the revolving door operating mechanism.

Figure 2 is a plan view of the truck shown in Figure 1 with a portion broken away to show the construction of the interior of the truck body.

Figure 3 is a plan view of the gear train for operating the entrance and exit door.

Figure 4 is a cross sectional view of the revolving door and adjoining parts of the truck body drawn to larger scale than in Figure 2.

Referring now to the drawings in which like characters of reference designate similar parts in the various views, 10 designates an armored truck body having a transverse partition 11 which divides the truck body into a rear compartment 12 for money and other valuables and a front compartment 13 containing a driver's seat 14 and a stool 15 for the guard, there being port holes 16 and 17 in the front and side walls of the body through which the guard may aim fire arms should occasion arise. A hinged door 18 on one side wall of the driver's comparment affords access to the compartment for the driver and the guard and preferably the front wall of the body is provided with bullet proof windows 19.

In carrying out the invention the partition 11 is terminated short of one side wall of the truck body to provide a door opening and a substantially semi-circular wall 20 is secured to the end of the partition and extends from thence to the side wall of the body to form a closure between the driver's compartment and the compartment for the valuables. This closure is provided with bullet proof windows 21 through which the guard and the driver or either one independently of the other, may identify the messenger or other authorized person, as will presently be fully described.

A revolving door is mounted within the enclosure of the semi-circular wall 20 and includes two radially disposed vertical walls 22 and a curved wall 23 which connects the radial walls. The radial walls form a V-shaped compartment for an authorized person to enter and leave the valuables compartment in the truck body. When the V-shaped compartment is in registration with a door opening 24 formed in the side of the vehicle the curved wall 23 of the revolving door seals the entrance to the valuables compartment as defined by the end of the partition 11 and a curved wall 25 which projects from the side wall of the truck body. When the V-shaped compartment is in registration with the door opening of the valuables compartment, the curved wall 23 will have moved into position to seal the door opening 24 in the side of the truck body.

The vertical walls 22 and 23 of the revolving door are connected together at the ends by a bottom disc 26 which forms a floor for the door, and are connected together at the top by a disc 27 which forms a ceiling for the door and reinforces the walls of the door to resist distortion from severe conditions of service. Gudgeons 28 are disposed at the centers of the discs and are rotatably mounted in suitable bearings in the roof and in the floor of the truck body.

The lower gudgeon projects beneath the floor of the truck body and is terminally equipped with a gear 29 having a smooth peripheral portion 30. The gear 29 meshes with a pinion 31 which is mounted on the lower end of a stand shaft 32 which is located within the driver's compartment and is equipped with a hand wheel 33 located within convenient reach of the driver. The driver may rotate the stand shaft to revolve the door through the meshing gears 29 and 31, the limit of rotation in either direction being determined by contact of the pinion 31 with the smooth portion 30 of the gear 29.

Obviously should an unauthorized person attempt to gain access surreptitiously to the compartment for the valuables, the deception will be detected by the driver as the V-shaped compartment in the door moves past the bullet proof windows 21, whereupon the driver may hold the revolving door against further advance and imprison the imposter until assistance arrives.

From the above description it is thought that the construction and operation of the invention will be fully understood without further explanation.

What is claimed is:

An armored truck body having a door opening on the exterior of the body, a transverse partition dividing the body into a rear compartment for valuables and a front compartment for the driver, a door opening in said partition, a revolving door for the body having radial walls forming a V-shaped compartment and having an arcuate wall connecting the radial walls and forming a closure which seals the door opening in the body when the V-shaped compartment is in registration with the door opening in the partition and which seals the door opening in the partition when the V-shaped compartment is in registration with the door opening in the body, and bullet proof windows in the partition through which the V-shaped compartment may be viewed from the driver's compartment during rotation of the door.

ROBERT A. STECKLY.